United States Patent [19]
Johnson, Jr. et al.

[11] Patent Number: 5,420,972
[45] Date of Patent: May 30, 1995

[54] METHOD AND APPARATUS FOR RENDERING LINES

[75] Inventors: Lee E. Johnson, Jr., Round Rock; Daryl J. Kokoszka, Austin, both of Tex.

[73] Assignee: International Business Machines Corporation, Armonk, N.Y.

[21] Appl. No.: 614,357

[22] Filed: Nov. 15, 1990

[51] Int. Cl.$^6$ .............................................. G06T 1/20
[52] U.S. Cl. ..................................... 395/143; 395/162
[58] Field of Search .............................. 395/140–143, 395/162–166, 126

[56] References Cited

U.S. PATENT DOCUMENTS

| | | | |
|---|---|---|---|
| 4,538,144 | 8/1985 | Yamagami | 340/747 |
| 4,586,038 | 4/1986 | Sims et al. | 340/729 |
| 4,609,917 | 9/1986 | Shen | 340/729 |
| 4,626,838 | 12/1986 | Tsujioka et al. | 340/744 |
| 4,648,049 | 3/1987 | Dines et al. | 364/521 |
| 4,658,247 | 4/1987 | Gharachorloo | 395/141 X |
| 4,677,573 | 6/1987 | Brown et al. | 364/521 |
| 4,679,041 | 7/1987 | Fetter et al. | 340/747 |
| 4,697,178 | 9/1987 | Heckel | 340/729 |
| 4,725,831 | 12/1988 | Coleman | 340/747 |
| 4,758,965 | 7/1988 | Liang et al. | 364/518 |
| 4,805,116 | 2/1989 | Liang et al. | 364/521 |
| 4,951,229 | 8/1990 | DiNicola et al. | 364/521 |
| 4,958,303 | 9/1990 | Assarpour et al. | 395/163 |
| 5,001,651 | 3/1991 | Rehme et al. | 395/126 |
| 5,010,515 | 4/1991 | Torborg, Jr. | 395/163 |
| 5,113,494 | 5/1992 | Menendez et al. | 395/162 X |
| 5,136,689 | 8/1992 | Walller | 395/143 |
| 5,185,599 | 2/1993 | Doornink et al. | 395/143 X |

OTHER PUBLICATIONS

Foley et al, Computer Graphics Principles and Practice pp. 72–91, 612–613, 855–921 (1990).
IBM Technical Disclosure Bulletin, vol. 29, No. 6, pp. 2526–2527, Nov. 1986, "Color Display Window Control".
IBM Technical Disclosure Bulletin, vol. 28, No. 12, pp. 5209–5210, May 1986, "Hardware Display Windowing System".
IBM Technical Disclosure Bulletin, vol. 27, No. 8, pp. 4618–4622, Jan. 1985, "Raster Graphics Drawing Hardware".
IBM Technical Disclosure Bulletin, vol. 27, No. 7B, pp. 4544–4545, Dec. 1984, "Techniques for Dynamic RAM Bandwidth Utilization".
IBM Technical Disclosure Bulletin, vol. 20, No. 9, pp. 3703–3706, Feb. 1978, "Generation of Points Using Bresenham's Algorithm".
Research Disclosure, Mar. 1990, No. 311, "Automatic BitBlt Direction Calculation".
Computer Graphics, vol. 22, No. 4, pp. 21–30, Aug. 1988, "The Triangle Processor and Normal Vector Shader: A VLSI System for High Performance Graphics".
SIGGRAPH '86, by Roger W. Swanson et al, pp. 95–101, "A Fast Shaded–Polygon Renderer".
Computer Graphics, by J. D. Foley et al, pp. 72–81, 1982.

Primary Examiner—Almis R. Jankus
Attorney, Agent, or Firm—Paul S. Drake

[57] ABSTRACT

A bitblt and line draw parameter calculator for preprocessing address information for a bitblt and line draw sequencer. The sequencer computes individual pixel addresses, controls color interpolation pacing and communicates with the memory hypervisor. By partitioning memory addressing into two tasks a first line or bitblt need only be partially processed prior to starting processing on a second line or bitblt.

11 Claims, 16 Drawing Sheets

METHOD AND APPARATUS FOR RENDERING LINES

DESCRIPTION

Related Patent Applications

Related patent applications include application U.S. Ser. No. 08/122,343 filed Nov. 15, 1990, entitled "High Performance Triangle Interpolator" application U.S. Ser. No. 08/109,414 filed Nov. 15, 1990, entitled "High Peformance Rasterization Engine" IBM copending application U.S. Ser. No. 08/313,668 filed Nov. 15, 1990, entitled "Hierarchical Memory Controller" and application now U.S. Pat. No. 5,339,394 filed Nov. 15, 1990, entitled "I/O Register Protection Circuit".

Technical Field

The present invention relates generally to computer graphics cards and more specifically to a high performance rasterization processor.

Background Art

FIG. 1 is a block diagram of a typical scalar computer 100. The computer includes a main processor 110 coupled to a memory 120, an input device 130 and an output device 140. Input device 130 may include a keyboard, mouse, tablet or other types of input devices. Output device 140 may include a text monitor, plotter or other types of output devices. The main processor may also be coupled to a graphics output device 150 such as a graphics display through a graphics card 200. Graphics card 200 receives instructions regarding graphics from main processor 110. The graphics card then executes those instructions and generates RGB signals to the graphics display 150 thereby rendering the desired graphics output from the workstation processor.

Disclosure of the Invention

The present invention provides an apparatus and a method to render lines including multiple processors connected in series, each processor performing a sequential portion of a Bresenham line draw algorithm.

A bitblt and line draw parameter calculator preprocesses addressing information for a bitblt and line draw sequencer. The sequencer computes individual pixel addresses, controls color interpolation pacing and communicates with the memory hypervisor. By partitioning memory addressing into two tasks (an address preprocessing task and a pixel addressing task, each task to be performed by separate subsystems), a first line or bitblt need only be partially processed prior to starting processing on a second line or bitblt. This also applies to both Bresenham and DDA line calculations. This is particularly useful when rendering triangle primitives.

A further understanding of the nature and advantages of the present invention may be realized by reference to the remaining portions of the specification and the drawings.

BEST MODE FOR CARRYING OUT THE INVENTION

Figure 1:
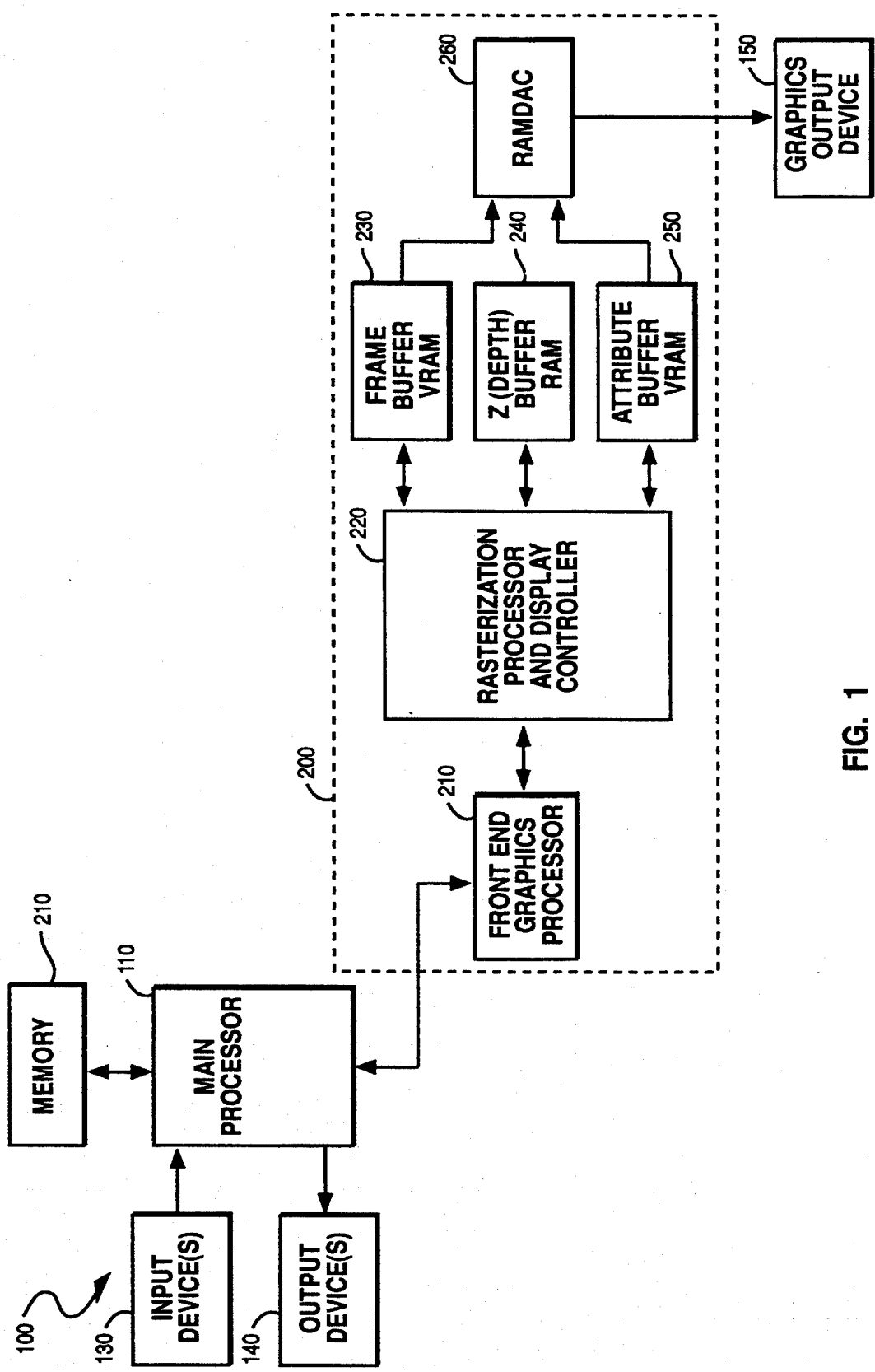
FIG. 1 is a block diagram of a typical scalar computer.

In a preferred embodiment of the invention, graphics card 200 includes a front end graphics processor 210, a rasterization processor and display controller 220 (also known as a rasterizer or a rasterization engine), a frame buffer 230, a Z buffer 240, an attribute buffer 250, and a RAMDAC 260. The frame buffer and the attribute buffer are usually VRAM and the Z buffer is usually DRAM. The front end graphics processor 210 receives instructions from the main processor regarding a graphics construct or image in world coordinates and described generally by what are called image primitives which include triangles, bitblts, lines, etc. The front end graphics processor can also handle pixel instructions from the workstation processor. The front end graphics processor then performs various transformation, clipping and lighting instructions thereby describing the graphics construct or image in near screen coordinates. This information is then passed on to rasterizer 220.

Rasterizer 220 performs an inner loop of the processing of a graphics image or construct. The rasterizer typically generates pixels along a line primitive, copies from one area on a display to another, performing a logical or arithmetic function between two areas on a display (such as an exclusive-OR bitblt), filling a triangle shaped area with shaded pixels after performing a depth comparison test (Z buffered Gouraud shaded triangles), and other typical graphics functions. Overall, the rasterizer updates the frame buffer, Z buffer and attribute buffer in screen coordinates based on the information from the front end graphics processor and the information previously stored in the buffers.

The frame buffer 230, which may be double buffered, includes a description of the red, green and blue colors for each pixel of the graphics display. The Z buffer contains a description of the depth or Z value of the pixels stored in the frame buffer. This information is useful for the rasterizer to determine whether or not a proposed pixel to be displayed based on a logical test. If the logical test is false, then the frame and Z buffers are not updated and the current pixel is displayed rather than the proposed pixel. If the logical test is true, then the frame and Z buffers are updated and the proposed pixel is displayed. In the preferred embodiment, the frame buffer has 24 planes (8 planes each for red, green and blue) for 1280 by 1024 pixels and the Z buffer has 24 bits per pixel for the same number of pixels. The attribute buffer 250, which may also be double buffered, includes control information about the pixels in the frame buffer such as which windows, overlays and microcode plane masks they belong to, whether they are write protected, etc.

RAMDAC 260 then uses the description of the pixels in the frame buffer and the control planes from the attribute buffer to generate an analog RGB signal stream. Graphics display 150 then displays the graphical image using the RGB signal stream.

Figure 2:
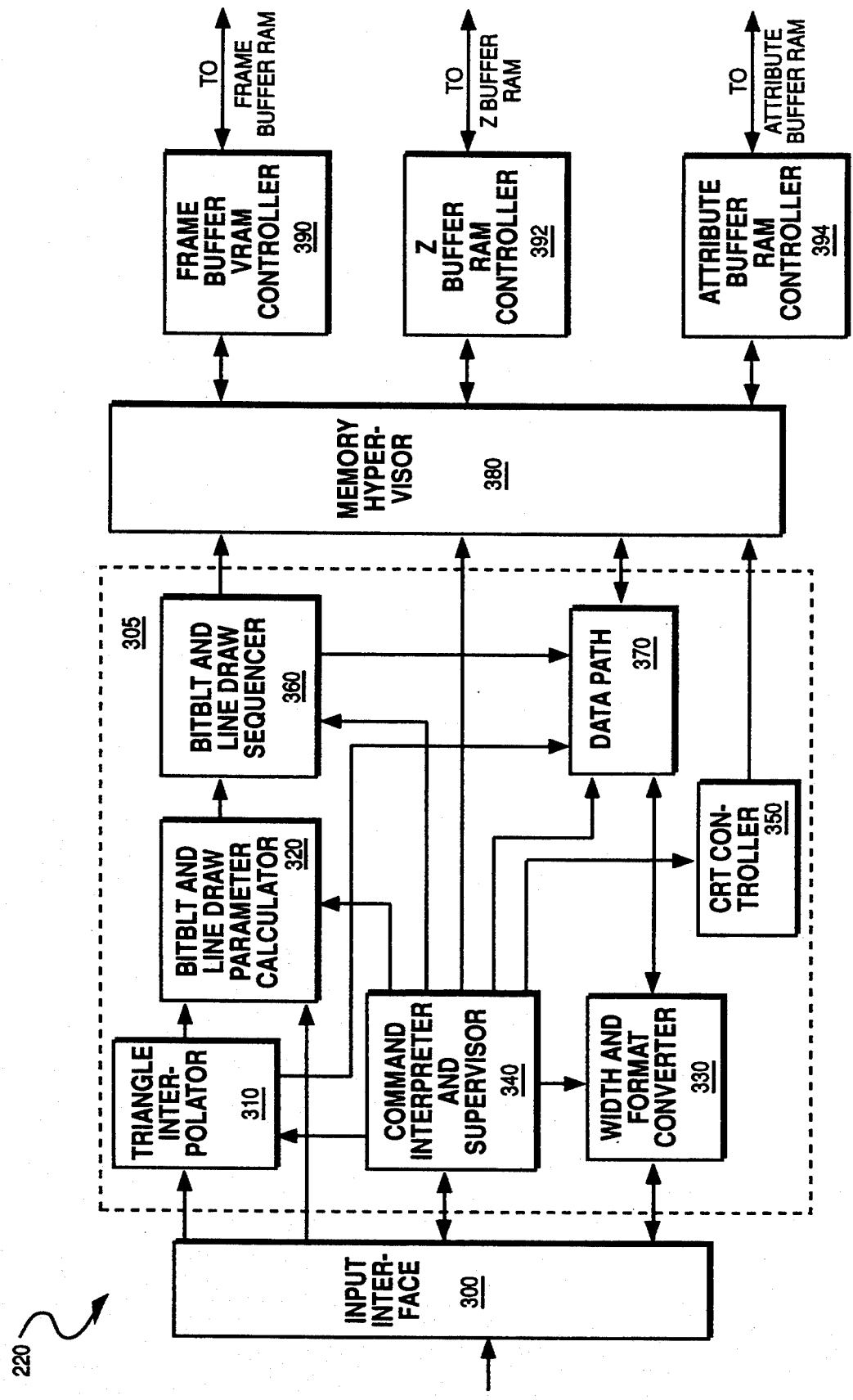
FIG. 2 is a block diagram of a preferred rasterization processor and display controller.

FIG. 2 is a block diagram of rasterization processor 220. An input interface 300 communicates with the front end graphics processor in a predetermined protocol. Based on this communication, the input interface decodes addresses, directs data to the appropriate internal registers, and generates interface timings which meet a rasterizer front end 305's requirements. For example, the input interface sends information pertaining to triangle primitives to a triangle interpolator 310. In addition, the input interface sends the address information of bitblt and line primitives to a bitblt and line draw parameter calculator 320 and the corresponding data to a width and format convertor 330. In the preferred embodiment, the input interface determines if the internal registers are free to receive data. If the internal registers are not available, then the input interface write protects the internal registers and holds up the data until the appropriate internal registers are free to receive the data. In addition, the input interface read protects internal registers that do not have valid data. The input interface has two-way communication, including status information, with a command interpreter and supervisor 340. The input interface also passes certain CRT control codes to a CRT controller 350.

Triangle interpolator 310 can be viewed as an address and data splitter. Information pertaining to triangle primitives are sent to the triangle interpolator 310, which the triangle interpolator then separates into a series of line primitives. The triangle interpolator then splits the address information from the data for the line primitives and passes the address information to the bitblt and line draw parameter calculator. The triangle interpolator also passes the corresponding data (including color and z information) to a data path 370 in the appropriate width and format. The triangle interpolator can also handle trapezoid primitives (quadrilaterals that have upper and lower edges that are parallel to the X axis) in a similar manner.

Bitblt and line draw parameter calculator 320 receives the address information of horizontal line primitives from triangle interpolator 310 and the address information of bitblt and line primitives in any orientation from the graphics processor via input interface 300. The bitblt and line draw parameter calculator then calculates various parameters for the bitblt and line primitives and passes that information to a bitblt and line draw sequencer 360. The bitblt and line draw sequencer then generates incremental pixel addresses for every pixel affected by the bitblt or line primitive. In addition, the sequencer also provides controlling information to data path 370. This information is then passed on to a hierarchical memory controller 380 (also referred to as a memory hypervisor) to update the frame buffer and the Z buffer.

Width and format convertor 330 translates input data from the front end graphics processor or main processor to a format compatible to the target buffer. The converter handles strings of data for pixels that are contiguous. The data includes color and Z information. Lines with interpolated color signals do not get passed to the width and format convertor, but are passed directly to the bitblt and line draw parameter calculator 320. In the preferred embodiment, the converter can convert 1 bit pixels to 24 bit pixels allowing expansion of monochrome text to any of two colors in the frame buffer. In addition, the width and format convertor 330 can convert 32 bit words to 40 bit words or other width and format conversions necessary for the utilization of the rasterizer. Once the width and format of the incoming data is converted, the data is passed to data path 370.

Data path 370 passes data from triangle interpolator 310 and the width and format convertor 330 to the memory hypervisor 380 in cooperation with the bitblt and line draw sequencer 360. This cooperation is coordinated by the command interpreter and supervisor 340. The data path also performs all necessary data manipulation such as pixel rotation and alignment, as well as source and destination mixing. Command interpreter and supervisor 340 coordinates the action of rasterizer 220 through various control signals. The command interpreter and supervisor also communicates the status of the rasterizer to the graphics processor via the input interface 300.

CRT controller 350 handles various control information for the CRT or display device. This includes horizontal and vertical sync refresh, frame blanking, composite sync, and other control signals that coordinate the actions of the graphics display device through memory hypervisor 380. The CRT controller also generates the addresses and load signals for the operations of the frame buffer.

Memory hypervisor 380 handles updating the frame buffer, Z buffer, and attribute buffer via frame buffer controller 390, Z buffer controller 392, and attribute buffer controller 394, respectively. The attribute buffer control planes are updated by the memory hypervisor as instructed by the graphics processor. The frame buffer pixels are updated according to a Z algorithm. That is, a logical test is performed. If the logical test is true, then the frame buffer and the Z buffer are updated by the new pixel values by the memory hypervisor 380. This Z algorithm is different from a Painter's algorithm wherein the Z values of primitives, rather than pixels, are compared to determine which primitive is in front of the other for display purposes.

The advantage of the separation of bitblt and line draw parameter calculator 320 and the sequencer 360 is so that once the parameters are calculated and passed on to the sequencer, the parameter calculator is then able to handle the next bitblt or line primitive without waiting for the line draw sequencer to complete its processes. This is particularly useful for handling triangle and trapezoid primitives. That is, the triangle interpolator 310 splits the triangle primitives into a series of horizontal line primitives which are passed sequentially to the bitblt and line draw parameter calculator. The triangle interpolator can then move on to the next triangle line while the bitblt and line draw parameter calculator and the bitblt and line draw sequencer go through their processes for handling the various horizontal lines.

In the preferred embodiment, the triangle interpolator works at a speed of ten cycles per line primitive split from a triangle or trapezoid primitive, the bitblt and line draw parameter calculator works at a speed of six cycles per line primitive, and the bitblt and line draw sequencer works at a speed of one cycle per pixel. As a result, the length of the line primitives (i.e. the number of pixels) drawn by the bitblt and line draw sequencer directly affects how frequently the sequencer can start drawing a line primitive such that either the parameter calculator or the sequencer is the one holding up the other. When drawing triangle primitives, the width of the triangle primitive determines the length of the resulting line primitives. If you use smaller and smaller triangle primitives, then the bitblt and line draw sequencer can keep up with the parameter calculator. This is extremely useful for small triangle calculations such as Gouraud shading. If you tesselate down to one triangle primitive per pixel, then that is roughly equivalent to Phong shading.

The individual subsystems of the rasterizer will now be shown to more fully describe the present invention. Subsequently, various timing diagrams will be shown to more fully describe how the various subsystems interrelate.

Triangle Interpolator

The triangle interpolator can be viewed as an address and data splitter. For example, a Gouraud shaded triangle can be rendered by slicing the triangle primitive into horizontal lines, interpolating along the left edge to calculate the XY values and colors for each line's start, and the right edge to find each line's end point. The triangle interpolator is given the following 18 parameters from the input interface:

| | |
|---|---|
| Ymin | y value of the top of the triangle |
| Ymax | y value of the bottom of the triangle |
| $X_L$ | starting x value of the left side of the triangle |
| $X_R$ | starting X value of the right side of the triangle |
| $\delta X_L$ | change in the X value of the left side of the triangle for every y |
| $\delta X_R$ | change in the x value of the right side of the triangle for every y |
| $R_O, G_O, B_O, Z_O$ | initial color and depth values, defined at [Ymin, Xleft] |
| $\delta R_S, \delta G_S, \delta B_S, \delta Z_S,$ $\delta R_X, \delta G_X, \delta B_X, \delta Z_X$ | color and depth deltas along the left slope, and x axis, respectively. |

From these 18 input parameters, the triangle interpolator generates the following 11 output parameters for triangle to be rendered, 7 of which are passed for each horizontal line primitive to be drawn:

| | |
|---|---|
| Y | vertical address for the horizontal line |
| $X_L$ | starting x value of the left end of the line |
| $X_R$ | starting X value of the right end of the line |
| R | initial red for line |
| G | initial green for line |

| | |
|---|---|
| B | initial blue for line |
| $\delta R$ | delta red |
| $\delta G$ | delta green |
| $\delta B$ | delta blue |
| Z | initial z |
| $\delta Z$ | delta z |

Figure 3:
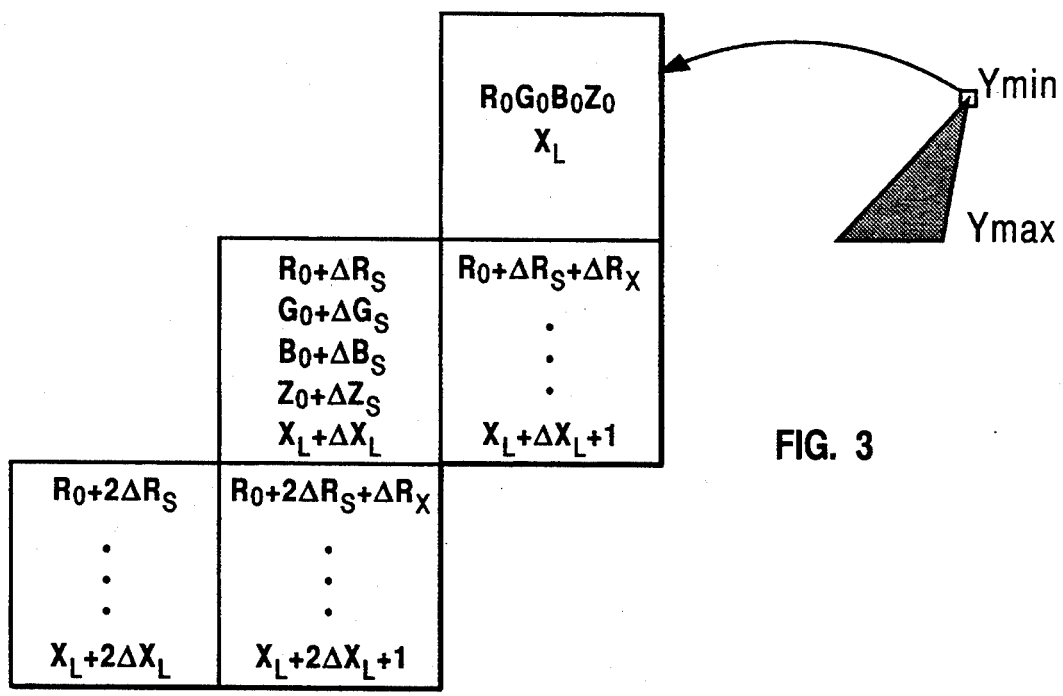
FIG. 3 is a diagram which shows the relationship between the parameters in the triangle data structure and the rendered triangle primitive.
Figure 11:
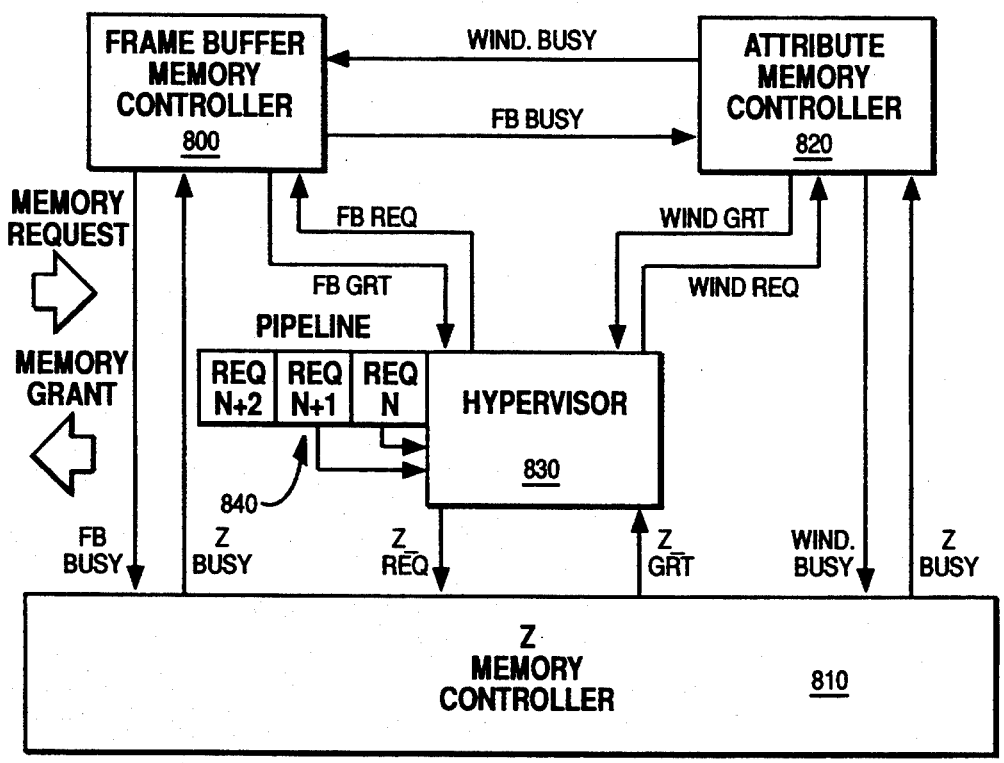
FIG. 11 is a more detailed block diagram of the memory hypervisor shown in FIG. 2.

FIG. 3A shows the relationship between the parameters in the triangle data structure input parameters and the rendered triangle primitive (a capital delta has been substituted for a $\delta$). For example, the top left-hand pixel of the triangle primitive (at $X_L$ and Ymin) has the initial color and depth values of $R_O$, $G_O$, $B_O$ and $Z_O$. The left-hand pixel on the horizontal line below Ymin has the X value of $X_L + \delta X_L$ and the color and depth values of $R_O + \delta R_S$, $G_O + \delta G_S$, $B_O + \delta B_S$, and $Z_O + \delta Z_S$.

Triangles are rendered as a series of color interpolated 3-D lines. The triangle interpolator computes 11 output parameters and passes them to the line draw and parameter calculator. When the new triangle is to be rendered, the parameters for the first line are sent to the line draw and parameter calculator immediately because no interpolation is required. In subsequent triangle interpolation loops, seven new address and color parameters are generated in each pass.

The following overall sequence is performed by the triangle interpolator. First, the triangle interpolator receives the 18 parameters of the triangle primitive from the input interface. Secondly, the output parameters for a first line primitive are generated to fill one horizontal span of the triangle. Y1, Y2, $X_L$, $X_R$ (with Y1 and Y2 equal to Y) are passed to the bitblt and line draw parameter calculator 320 and R, G, B, $\delta R$, $\delta G$, $\delta B$, Z, $\delta Z$ are passed to the data path 370. Thirdly, new parameters $X_L$, $X_R$, Y, R, G, B, Z are calculated and stored for the next line primitive to be calculated. Steps 2 and 3 are then repeated until Ymax is detected, thereby indicating the last line primitive to be generated.

FIG. 3B is a diagram of a preferred embodiment of the triangle interpolation subsystem that is used to calculate the output parameters from the input parameters. Triangle interpolator 310 includes a buffer (register file) management controller 400 (TBF_FSM), a triangle interpolation and parameter handoff controller 401 (TRI_FSM), an address mapper 402, a comparator 403, thirty six 32-bit words of register file storage 404, a carry look-ahead adder 405 for interpolation and its accumulator register 406, and data busses 407 to line generation subsystems (addressing, color and Z interpolation). The address mapper is a lookup table which creates the physical register file addresses by decoding the inputs from buffer management controller 400, handoff controller 401 and input interface 300. The comparator 403 detects an end-of-triangle condition. Carry look-ahead adder 405 is used for interpolation.

Register file 404 has enough storage capacity to hold parameters for two triangle primitives. This allows triangle operations to be doubled buffered. That is, data for a new triangle is loaded into an idle portion of the buffer while the interpolation controller 401 utilizes the other half of the buffer. Buffer management controller 400 insures that the two buffers are kept separate. The register file has two write and three read data ports. One write port (W1) of the register file as assigned for loading new data. The other write port (W0) is used by the interpolation controller two store computation results. The new data can be loaded into the idle buffer and parallel with triangle interpolation tasks until the idle half of the idle buffer is full. The three read data ports are used for parameter passing and computation.

The TRI_FSM algorithm used in the interpolation controller 401 is tuned to further increases throughput. The initial cycles of line generation need only the address information created by the triangle pass. The color parameters are not needed until line drawing actually begins. To take advantage of this, the triangle computation operations are sequenced such that the line addressing parameters are generated first then the color and depth parameters next. At the beginning of the interpolation pass, the line generator is checked for availability. If the check is positive, a parameter passing sequence different from the one described above is used. The address parameters are passed off one at a time directly from the accumulator and line sequencing is started while generation of color and depth parameters continues. The color and depth parameters are then passed at a later time. The parameter calculator 320 then processes the line addresses while the triangle interpolator continues processing color and depth information. The triangle controller can immediately begin the next pass or even a new triangle if the current triangle is complete and the idle buffer has been filled.

FIG. 3C is a timing diagram that shows the parallelism achieved by the triangle interpolator. For purposes of clarity, a state diagram of TRI_FSM is included. The horizontal axis represents increasing time. The vertical axis indicates the tasks being performed in each cycle. For example, from time T0 to time T1 the three line addressing parameters (Y0, XL0, XR0) are being transferred from the register file to the line draw parameter calculator while three new register file addresses are being clocked into latches in preparation for a jump to time T2. At time T4 to time T5 the three delta color values are being transferred while the read address needed for incrementing Y is being prepared. At time T8 to time T9, XR is being stored, Zi is being computed and the addresses for computing Ri are being prepared.

Bitblt and Line Draw Parameter Calculator

The bitblt and line draw parameter calculator 320 preprocesses addressing information for the bitblt and line draw sequencer 340. The sequencer 360 computes individual pixel addresses, controls color interpolation pacing and communicates with the memory hypervisor. By partitioning memory addressing into two tasks (an address preprocessing task and a pixel addressing task, each task to be performed by separate subsystems), a first line or bitblt need only be partially processed prior to starting processing on a second line or bitblt. This also applies to both Bresenham (see pages 74 to 81 of the second edition of FUNDAMENTALS OF INTERACTIVE COMPUTER GRAPHICS by J. D. Foley and A. Van Dam) and DDA (see pages 73 to 74 of the second edition of FUNDAMENTALS OF INTERACTIVE COMPUTER GRAPHICS by J. D. Foley and A. Van Dam) line calculations. This is particularly useful when rendering triangle primitives.

The 4 line input address parameters are processed to produce line direction and quadrant information, as well as the Bresenham algorithm parameters. The bitblt inputs must be processed to determine which direction in X and Y that pixel reading and writing must proceed such that pixels are not written over before being copied. The input and output parameters for line primitives are:

| Line Inputs: | |
|---|---|
| Y1 | y value at a first endpoint |
| Y2 | y value at a second endpoint |
| X1 | x value at a first endpoint |
| X2 | x value at a second endpoint |
| Line Outputs: | |
| Ystart | Y1 |
| Yend | Y2 |
| Xstart_quot | X1 divided by five |
| Xend_quot | X2 divided by five |
| Xstart_rem | Remainder from division of X1/5 |
| Xend_rem | Remainder from division of X2/5 |
| D_term, I1, I2 | Bresenham Algorithm Parameters |
| Slope_GT_1 | Slope of line is $> 1$ |
| Slope_pos | Slope is positive |
| X1_GT_X2 | $X1 > X2$ |

The input and output parameters for bitblts are:

| BitBlts Inputs: | |
|---|---|
| Xsource | Lowest X address of the block to be copied |
| Ysource | Lowest Y address of the block to be copied |
| Xdestination | X address of upper left corner of block destination |
| Ydestination | Y address of upper left corner of block destination |
| Width | Number of pixels wide |
| Height | Number of pixels high |
| BitBlt Outputs: | |
| Xsrc_start_d5 | Starting X address for the source block |
| Xsrc_end_d5 | Ending X address for the source block |
| Ysrc_start | Starting Y address for the source block |
| Ysrc_end | Ending Y address for the source block |
| Xdest_start_d5 | Starting X address for the destination block |
| Xdest_end_d5 | Ending X address for the destination block |
| Ydest_start | Staring Y address for the destination block |
| Ydest_end | Ending Y address for the destination block |
| Xmasks (4) | 5-bit Masks indicating which pixels in a 5-pixel group are to be manipulated at a block boundary. |

The parameter calculator enables a mix of graphics primitives in any sequence. For example, a bitblt can precede a DDA line, which can then precede a sequence of polyline segments, a series of triangle spans, etc. An idle state of the parameter calculator allows initialization to occur, thereby not wasting any cycles. In addition, an final state of the parameter calculator, where output parameters are passed to the sequencer, performs the final parameter calculations. As a result, the last output values are passed directly to the sequencer rather than to registers within the parameter calculator. This subsystem can also perform up to five arithmetic operations simultaneously during some processing steps [including $(a+b)$, $(a-b)$, $(b-a)$, $(a-b)*2$, $a-b*2$, $a*2$, $a<b$, $a>b$, $a=b$, $a/5$] to maintain high throughput.

Figure 4:
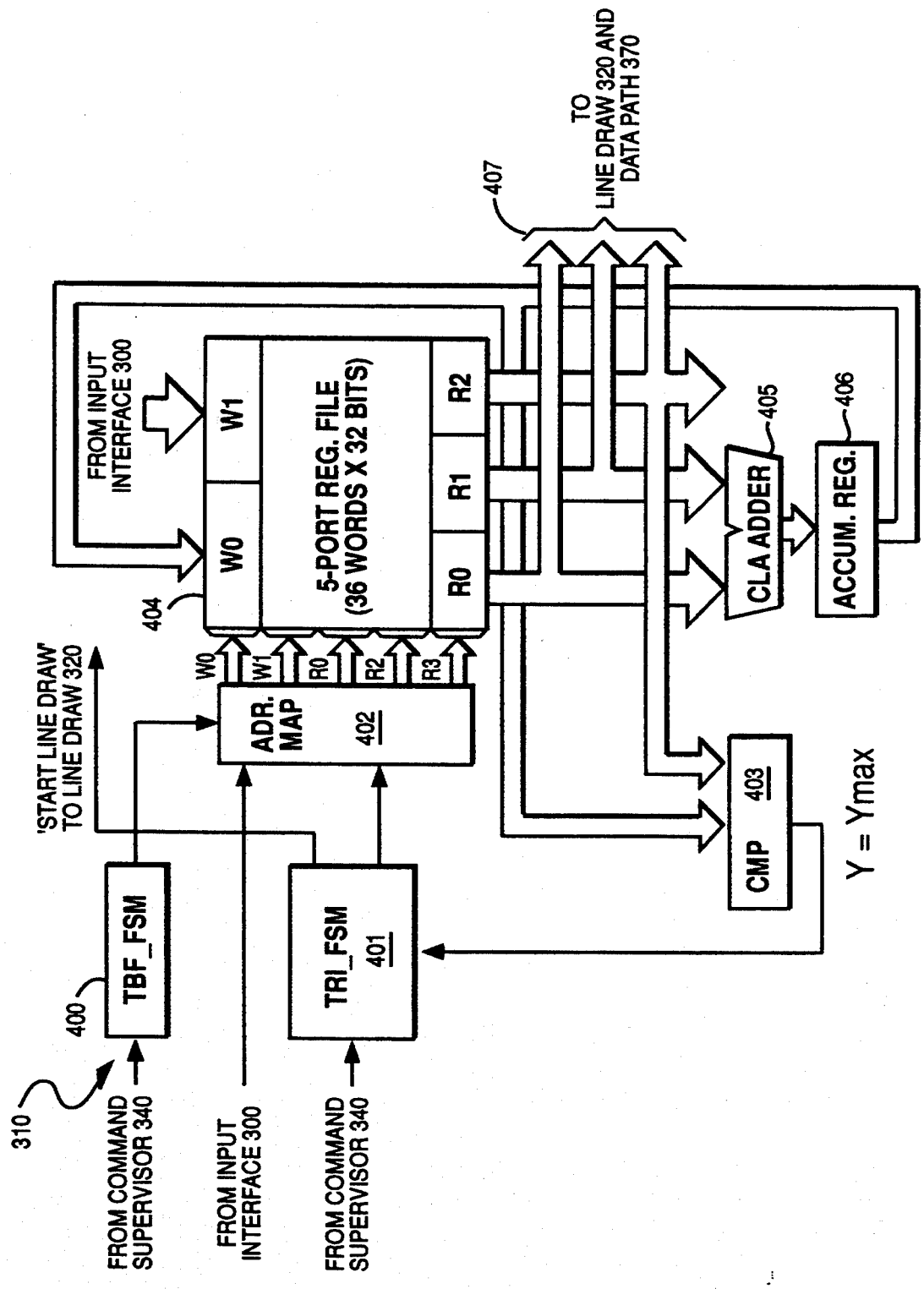
FIG. 4 is a diagram of a preferred embodiment of the triangle interpolation subsystem.

FIG. 4A is a block diagram of the bitblt and line draw parameter calculator dataflow. The input parameters are received from input interface 300 and triangle interpolator 310. The output parameters are then calculated from the input parameters by multiplexers 510, inverters 520, carry look-ahead adders 530, divider 540 and registers 550.

FIG. 4B is a state flow diagram for the parameter calculator 320, with detail and emphasis on a Bresenham line sequence. This controller switches the multiplexers and registers depicted in FIG. 4A to complete the parameter calculation sequence. For example, step slp_gt1, the variable dx is compared to dy. If dy is greater than dx, then the slope of the line to be drawn creates an angle greater than 45 degrees, so the slope_gt_one flag is set. In step d_term, the slope_gt_one flag is tested to determine how the dterm variable is calculated, as shown in the comments accompanying the figure.

Bitblt and Line Draw Sequencer

The bitblt and line draw sequencer calculates frame buffer addresses, controls, color interpolation pacing and communicates with the memory hypervisor. The sequencer works with data path 370 to pass address information from the sequencer and corresponding data from the data path in a coordinated manner.

The input address parameters are processed to produce pixel addresses and write enables, using either the Bresenham or DDA algorithm for lines. The bitblt inputs determine which direction in X and Y that pixel reading and writing must proceed such that pixels are not written over before being copied. The input and output parameters for the sequencer are:

| Line Inputs: | |
|---|---|
| Ystart | Y1 |
| Yend | Y2 |
| Xstart_quot | X1 divided by five |
| Xend_quot | X2 divided by five |
| Xstart_rem | Remainder from division |
| Xend_rem | Remainder from division |
| D, I1, I2 | Bresenham Algorithm Parameters |
| Slope_GT_1 | |
| Slope_pos | |
| X1_GT_X2 | |
| Bitblt Inputs: | |
| Xsrc_start_d5 | Starting X address for the source block |
| Xsrc_end_d5 | Ending X address for the source block |
| Ysrc_start | Starting Y address for the source block |
| Ysrc_end | Ending Y address for the source block |
| Xdest_start_d5 | Starting X address for the destination block |
| Xdest_end_d5 | Ending X address for the destination block |
| Ydest_start | Staring Y address for the destination block |
| Ydest_end | Ending Y address for the destination block |
| Xmasks (4) | 5-bit Masks indicating which pixels in a 5-pixel group are to be manipulated at a block boundary. |
| Outputs: | |
| PixXaddr | 8-bit X frame buffer address |
| PixYaddr | 10-bit Y frame buffer address |
| WeMask | 5-bit pixel write enable mask |
| MemReadReq | Frame buffer read request |
| MemWriteReq | Frame buffer write request |
| DestNotSource | Flag indicating if operation is destination or source. |

Figure 5:
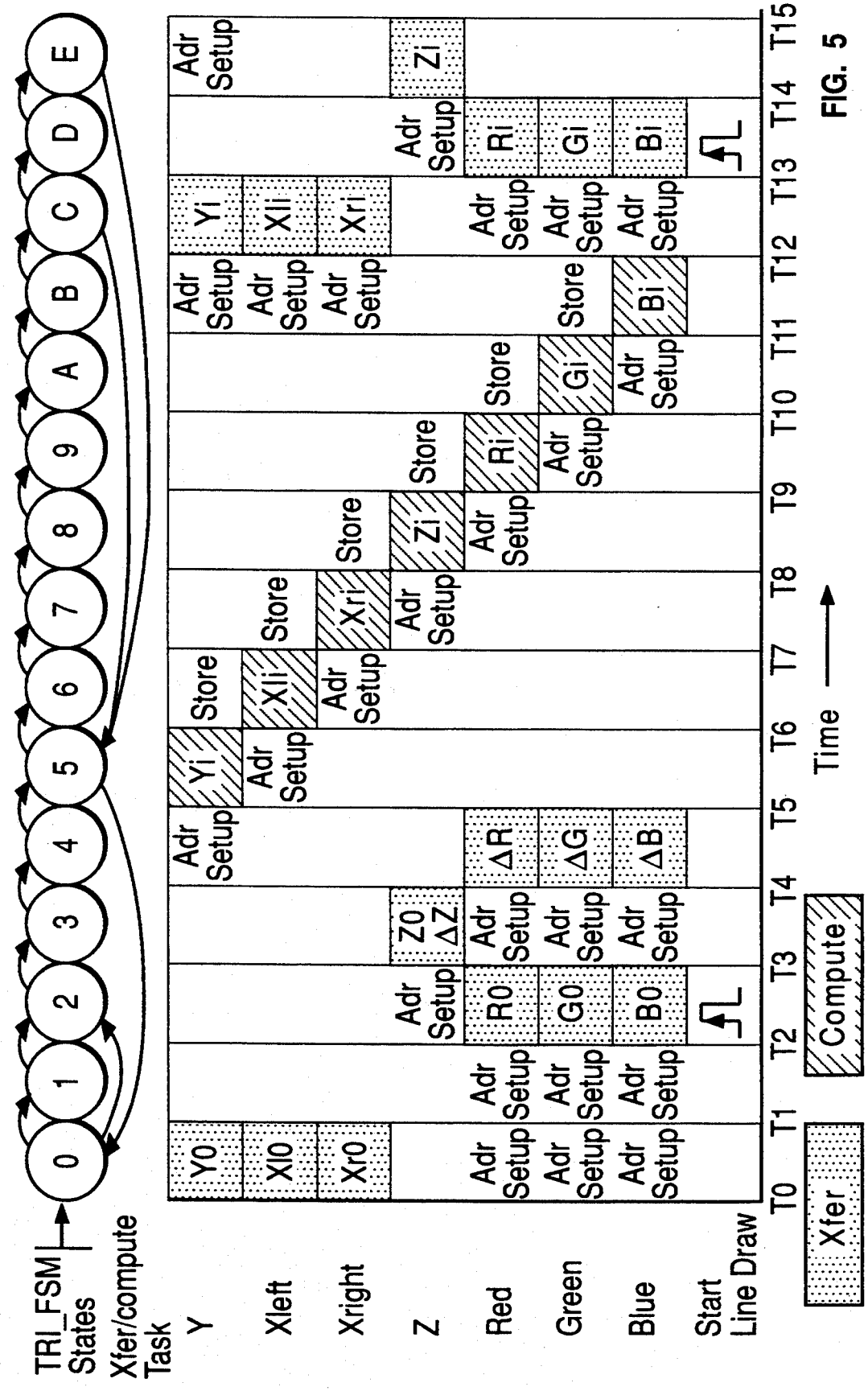
FIG. 5 is a timing diagram which shows the parallelism achieved by the triangle interpolator.

FIG. 5 is a block diagram of the bitblt and line draw sequencer dataflow. Bitblt and line draw parameter calculator 320 is shown providing data to the bitblt and line draw sequencer 360. Sequencer 360 includes addressing control 610, arithmetic and logic units 620, 630 and 640 (also known as arithmetic units), memory request control 650 and memory interface 660. The arithmetic units perform the necessary calculations to draw the primitives from the data provided by the parameter calculator. The arithmetic units 620 and 630 handle the Y variables and arithmetic unit 640 handles the X variables. Addressing control 610 controls the operation of the arithmetic units and the results of their operations being passed to the memory interface. Memory request control 650 controls the operations of the memory interface. The memory interface stores and formats data for being passed to the memory hypervisor. In addition, the operation of the memory request control and the memory interface allows the addressing control and the arithmetic units to function at high speed in parallel.

Input Interface

Figure 6:
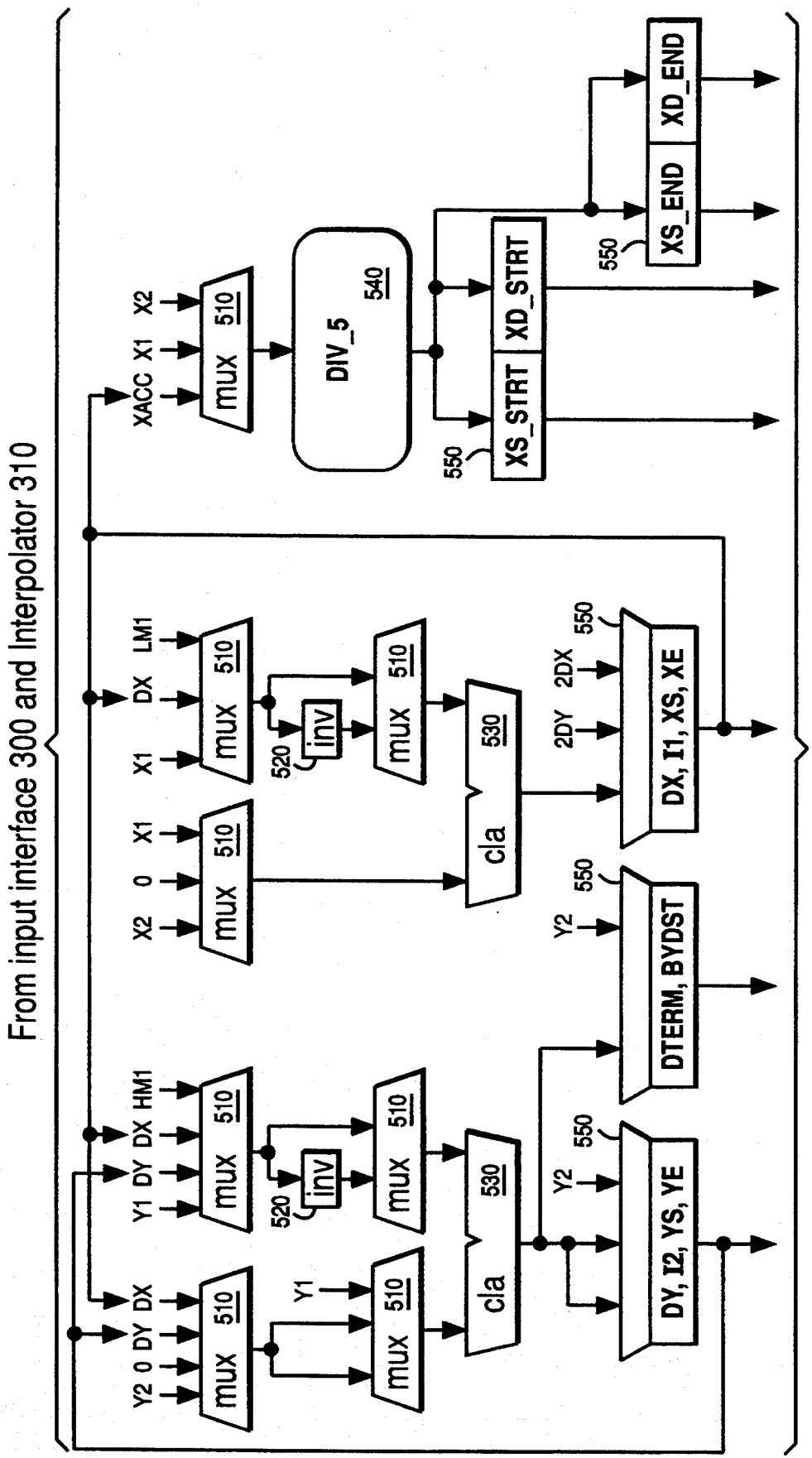
FIG. 6 is a block diagram of the bitblt and line draw parameter calculator dataflow.

FIG. 6A is a more detailed block diagram of the input interface 300 shown in FIG. 2. An address decoder 700 includes a register 702 and a decoder 704. The decoder determines what type of request is pending and classifies the requests into different types such as overall request, triangle request, etc. There are also miscellaneous requests that are never protected. That is, an interrupt register can always be read or written. The request, read/write and strobe lines from the front end processor 210 and the busy signals from the rasterization processor functional blocks are all inputs to a register protection checker 710. The register protection checker includes an interface 712 and an interface controller state machine 714. The checker compares the type of request with the current status of the busy lines to determine if the register operation can proceed. When the operation can proceed the ready line is asserted to the front end processor and (if the register operation is a write) the write strobe line is asserted to the correct functional block.

FIG. 6B is a state diagram of the input interface in operation. The command interpreter and supervisor 340, triangle interpolator 310, bitblt and line draw parameter calculator 320, and data path 370 each provide a busy signal to the input interface indicating when their internal registers are free to be read or written. When an internal register is written (or read) by the front end processor, the input interface determines if the operation may proceed by testing a busy signal from the associated functional block. If the register operation may proceed, then the input interface returns a ready signal to the front end processor. If the register operation is a read, then the data is sent to the front end processor. If the register operation is a write, then the internal register is strobed and the new data is loaded into it. If the register operation cannot proceed, then the input interface withholds ready until the functional block permits the operation. The status of the busy signal of each block can be more than just a simple busy indicator. If the block has an input FIFO, then the busy can correspond to a FIFO full signal.

The register protection scheme improves overall performance by eliminating the testing of a status register. Whenever the next register load can proceed, the time spent testing the status register and determining that the register can be loaded is wasted. The performance improvement is most dramatic when only a few parameters need to be loaded for an operation and the operation is quick (such as a short line). In these cases, the time taken to read the status register indicating not busy is large relative to the time to load the parameters.

The register protection scheme also facilitates overlapping operations. For example, while the bitblt and line draw parameter calculator 320 is completing a line, parameters can be loaded into the triangle interpolator. This increases the performance when there is a mixture of operations to be performed. When starting an operation, the command interpreter and supervisor 340 has a separate busy signal, thereby preventing update of the start operation register until the previous operation is complete.

While some registers are specific to one type of operation, others are common to more than one. The input interface allows each internal register to be protected by one or more busy signals. This allows, for example, the XY address of a line to be protected solely by the line drawer busy signal while the destination buffer selection (frame buffer, Z buffer or attribute buffer) requires all the busy signals to be inactive to prevent changing the buffer selection in the middle of an operation. Providing this differentiation allows a simple DMA controller to load any register in the rasterization processor in any order. The input interface prevents a register from being loaded at an improper time. The DMA controller can be set to copy from a display list in memory to the rasterization processor. As the rasterization processor completes operations, the next set of parameters can be loaded. Different operations can be mixed, as well as changes to overall control registers (buffer selection for example).

By separating address and data busy signals, such as the busy from the bitblt and line draw parameter calculator 320 and the busy from the data path 370, fast characters (bitblt) can be processed with a simple DMA interface. In this case, the protection mechanism allows the address information (destination X, Y) of each successive character to be entered while the previous character bitblt is completed. Then the protection mechanism will feed the data path at the rate it can handle the new character image.

Memory Hypervisor

There are several ways to implement Z and attribute compare in hardware. One is to have a single memory controller for the frame, attribute and Z buffers. The rasterizer front end generates address, color and Z depth information, decides which buffer currently needs to be accessed, and sends a request to the memory controller to access the appropriate buffer. When the memory controller has finished, the rasterizer sends the next request to be processed. While Z and/or attribute compare is active, several memory requests must be sent by the rasterizer front end to write a single pixel to the destination.

The performance of this implementation is limited primarily for three reasons. The first is that all buffer accesses must be done sequentially because there is only one memory controller. The second reason is that the process of reading the Z and/or attribute buffers, sending the data to the rasterizer front end, doing compares, deciding which buffer to access next, and sending the appropriate request to the memory controller requires many pipeline stages. This series or loop of operations must be performed for every pixel. The time required to go through this loop is almost always too long to operate at maximum memory bandwidth. The third reason is that the rasterizer front end cannot start rasterizing (i.e., generating address, color and Z depth) the next pixel until it finishes doing the Z and/or attribute compares and writes the current pixel to the destination buffer. Conversely, the Z and/or attribute compares cannot be performed unless that pixel has been rasterized. Since the time required to rasterize a pixel and to access a buffer varies, there will be many instances where the memory banks will be waiting for a pixel to be rasterized or the rasterizer will be waiting for the memory accesses to complete. These wait states reduce overall performance.

Figure 7:
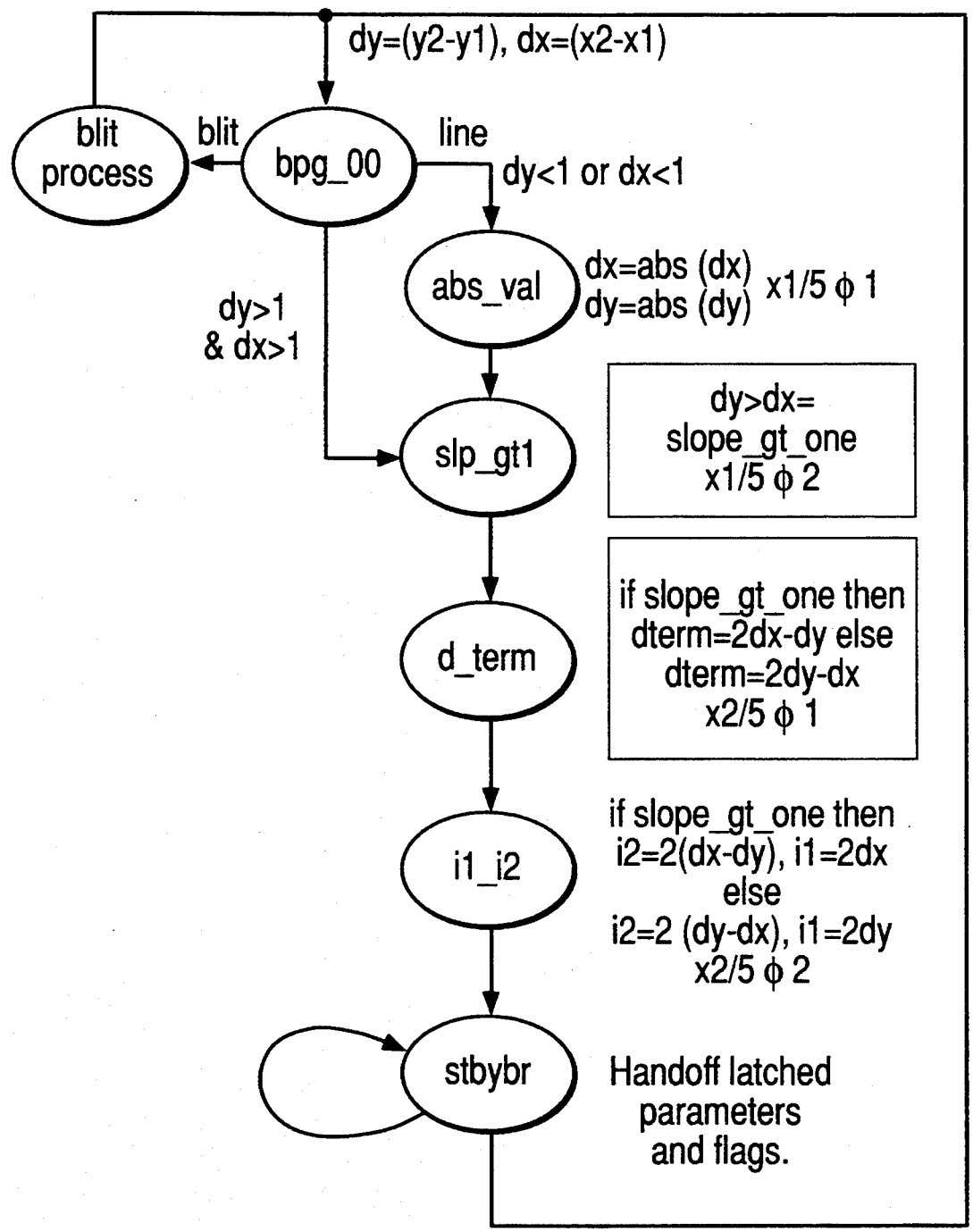
FIG. 7 is a state flow diagram of the bitblt and line draw parameter calculator.

FIG. 7A is a more detailed block diagram of the memory hypervisor shown in FIG. 2. Parallel independent memory controllers 800, 810 and 820 are used for Z, attribute buffers, respectively. This makes it possible to execute multiple memory requests simultaneously such as reading the attribute buffer while writing the frame buffer. Even if two memory requests cannot be executed simultaneously because the buffers share data busses, it is possible to overlap the memory controllers such that the shared busses are run at maximum speed.

A hypervisor 830 is used to initiate and control the compare operations and memory controllers. It is close (i.e., few pipeline stages) to the memory controllers, thereby allowing the compare results to be utilized quickly. This allows us to more efficiently utilize the data busses.

Rasterizer front end requests are placed into a pipeline or buffer 840 in front of the hypervisor. This allows smoothing of the variations in performance between the rasterizer front end and the memory banks, thereby allowing each to operate at maximum speed more often. This reduces the number of instances where the memory banks are waiting for a pixel to be rasterized or the rasterizer front end is waiting for the memory accesses to complete. It also allows the hypervisor to start execution of the next memory operation while executing the current operation.

Read and write requests are sent by the rasterizer front end to the hypervisor. When the hypervisor is ready to accept a request, it will send a grant to the rasterizer front end and latch all necessary data associated with the request. Upon receiving a grant, the rasterizer front end considers the request complete and begins generating the next request, even though the hypervisor has not completed the first request.

In addition to read and write operations, refresh operations must be done on both VRAMs and DRAMs to ensure memory data integrity. Also, serial register load operations must be done on the VRAMs in order to display the memory contents on a graphics display. When either or both of these operations need to be performed, an interrupt is sent to the hypervisor. The hypervisor will complete the front end read or write request, cease operation until the required refresh/serial load operations are completed, and then resume processing rasterizer requests.

The pipelining, synchronization and sequencing of the memory requests are better understood with a few examples. FIG. 7B shows how the apparatus of FIG. 2 would process a series of writes to the frame buffer with Z and attribute compare being performed. First the rasterizer front end (FIG. 2) puts a write request into the pipeline. The hypervisor immediately determines which compare options must be performed (in this example, both attribute and Z). On the next cycle, a read request is sent to the attribute memory controller. Since this controller is inactive, it immediately sends a grant to the hypervisor and latches the address. The hypervisor considers the operation done upon receiving the grant and, on the next cycle, sends a read request to the Z memory controller. In this example, the Z and frame buffer memory share a common data bus, therefore the Z memory controller must wait until the frame buffer memory controller is done with the data bus. This wait period is determined by passing various busy signals between all the memory controllers. After the appropriate wait period, the Z memory controller sends a grant to the hypervisor. Next, a write request is sent to the Z memory controller. If the Z and/or attribute compare is false, then the Z memory controller will abort the write operation after sending the grant. Finally, a write request is sent to the frame buffer controller. Again, if the compare is false, the frame buffer controller will abort the write operation after sending the grant.

FIG. 7C shows how the rasterizer would process a series of writes to the frame buffer with only an attribute compare being performed. First, the rasterizer front (FIG. 2) end puts a write request into the pipeline. The hypervisor immediately determines which compare options must be performed (in this example, only attribute compare). On the next cycle, a read request is sent to the attribute memory controller. Since this controller is inactive, it immediately sends a grant to the hypervisor and latches the address. Upon receiving this grant, the hypervisor simultaneously sends a write request to the frame buffer memory controller and a read request to the attribute frame buffer (this attribute read request is for request N+I in the pipeline, which is obtained one pipeline stage before the regular processor request). If the attribute compare is false, the frame buffer controller will abort the write operation after sending the grant.

Timing Diagrams

Figure 8:
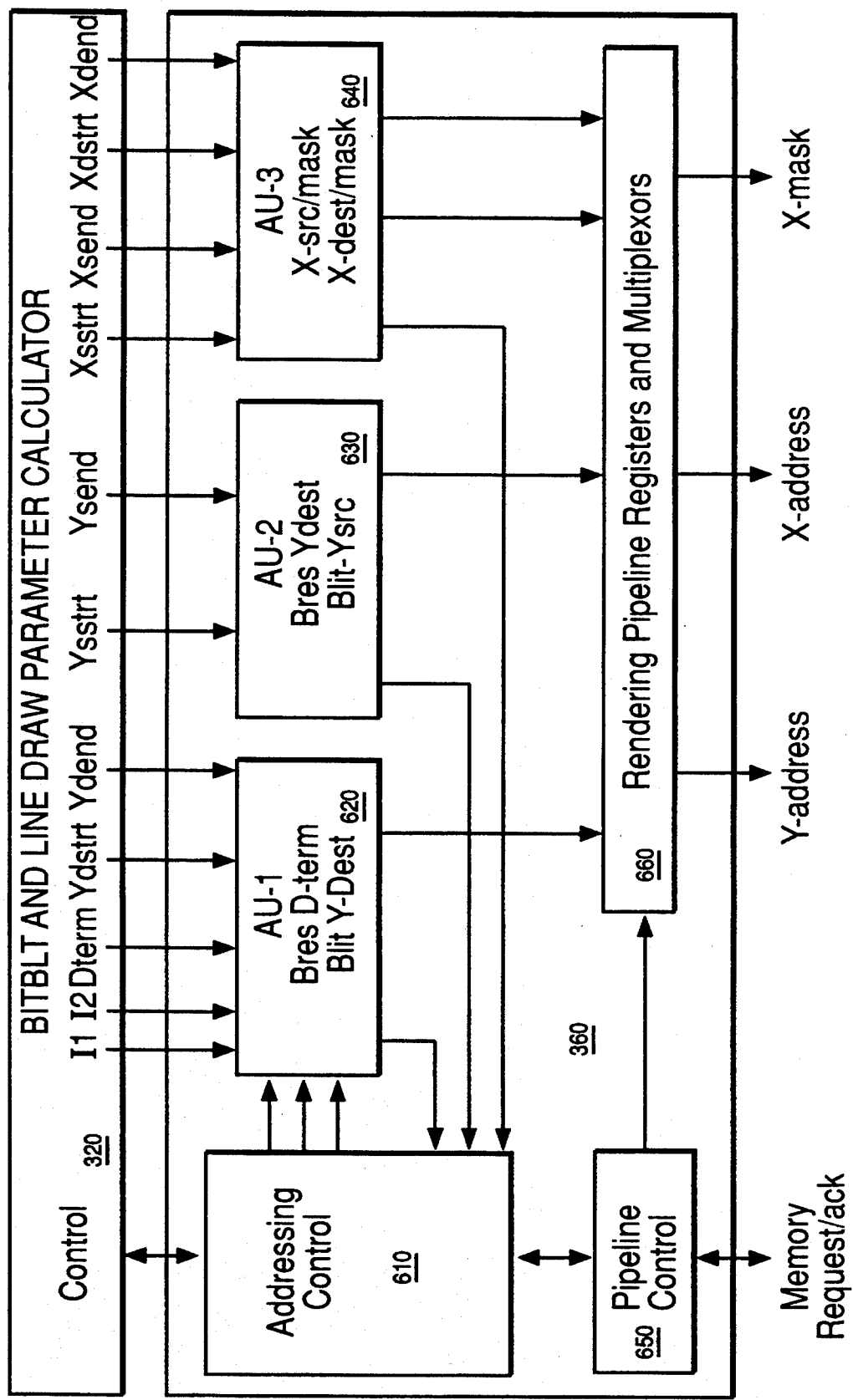
FIG. 8 is a block diagram of the bitblt and line draw sequencer dataflow.
Figure 9:
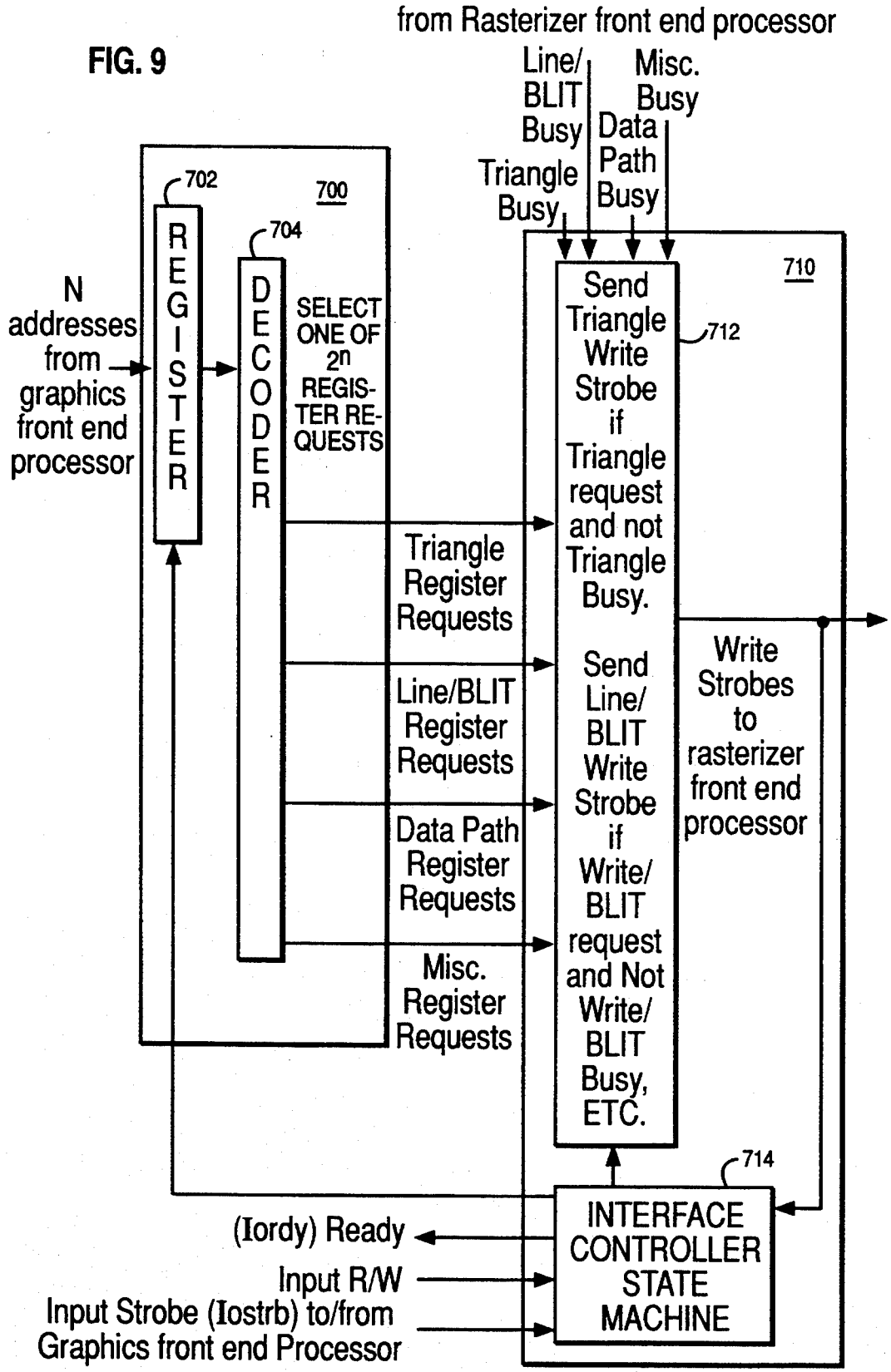
FIG. 9 is a more detailed block diagram of the input interface shown in FIG. 2.
Figure 10:
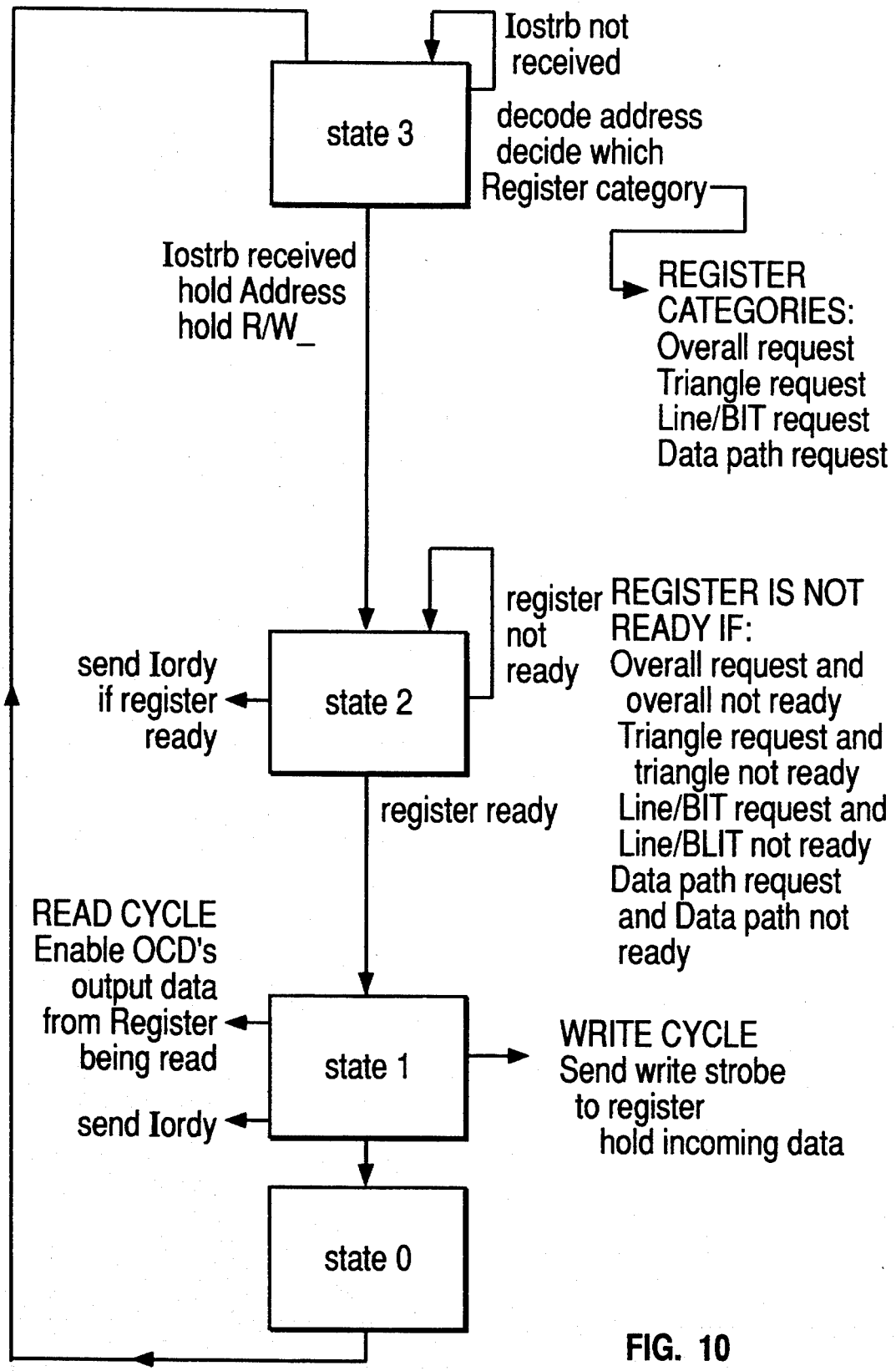
FIG. 10 is a state diagram of the input interface shown in FIG. 6A.
Figure 12:
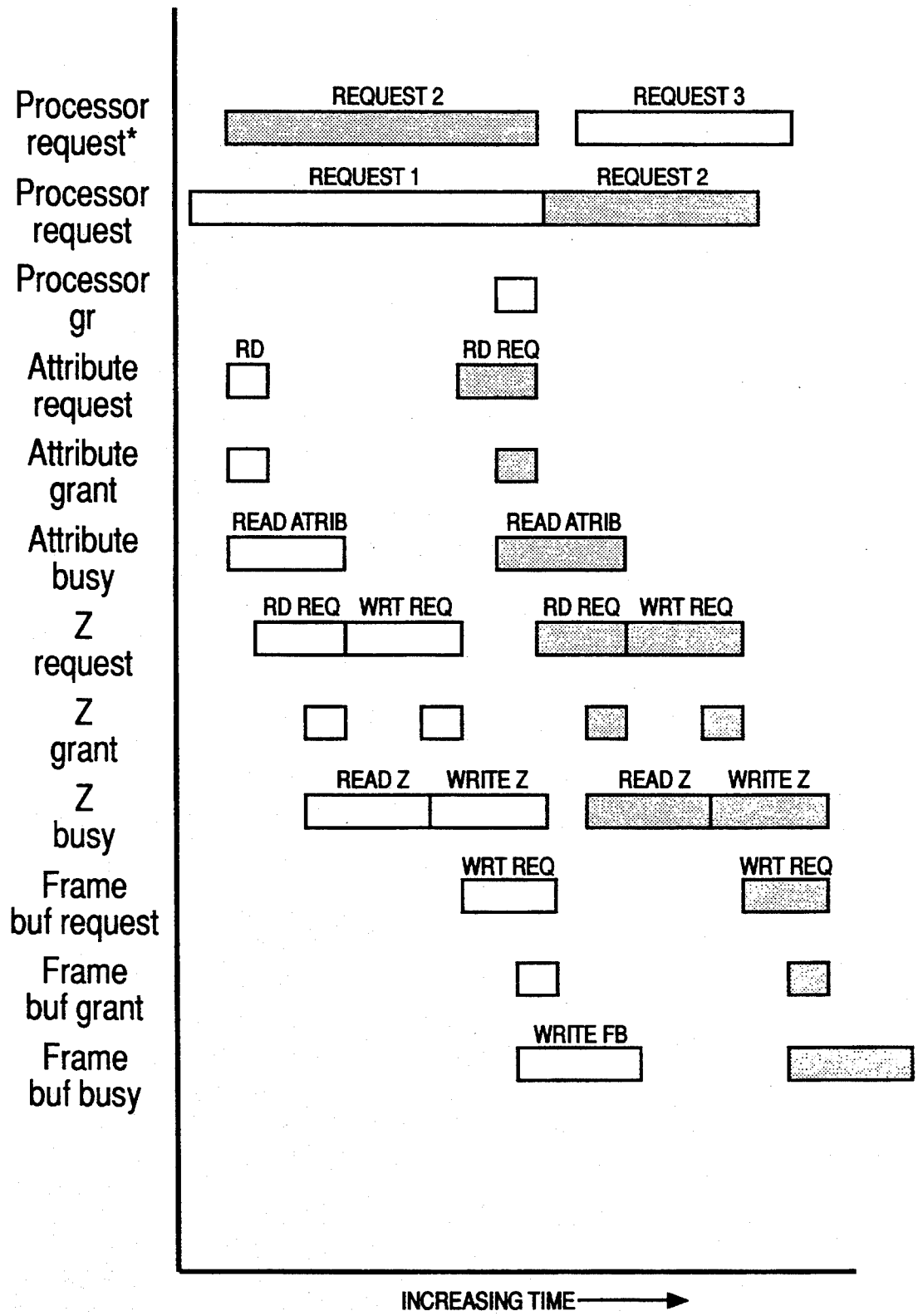
FIGS. 12 and 13 show how the memory hypervisor of FIG. 2 would process a series of writes to the frame buffer.
Figure 13:
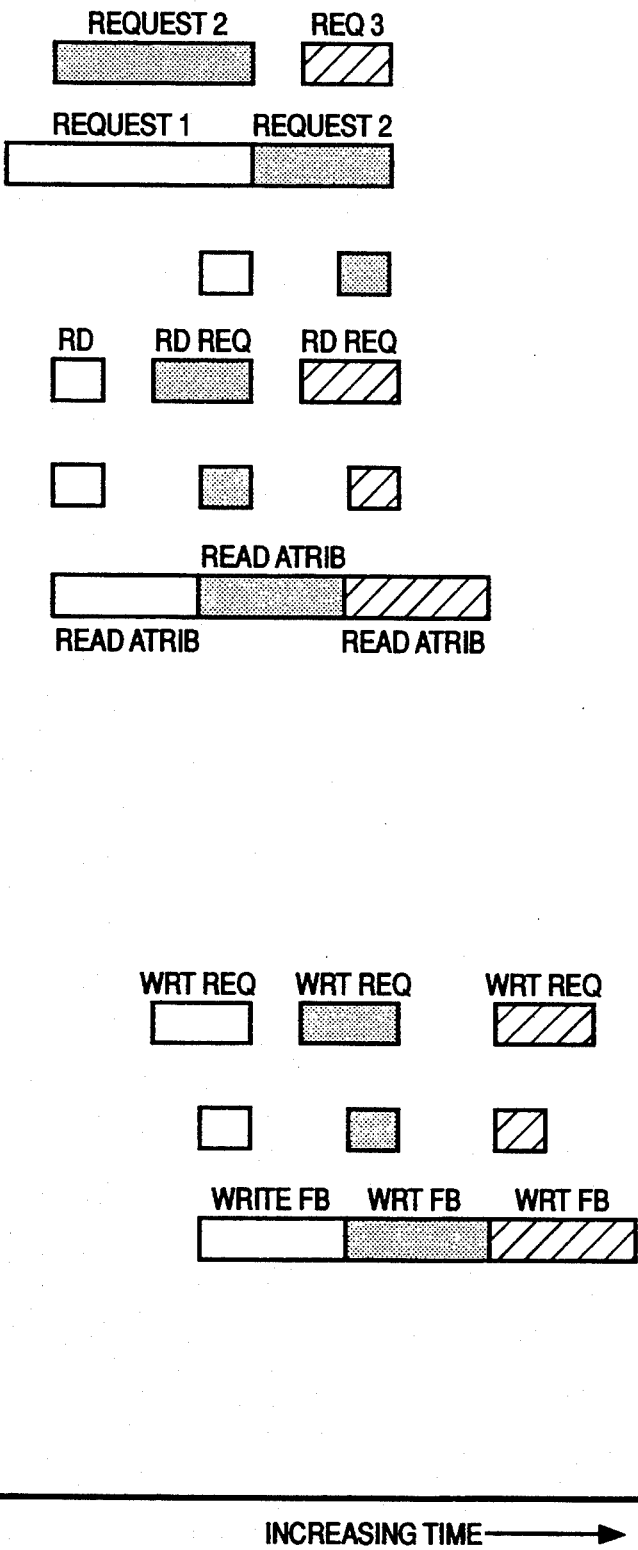
Figure 14:
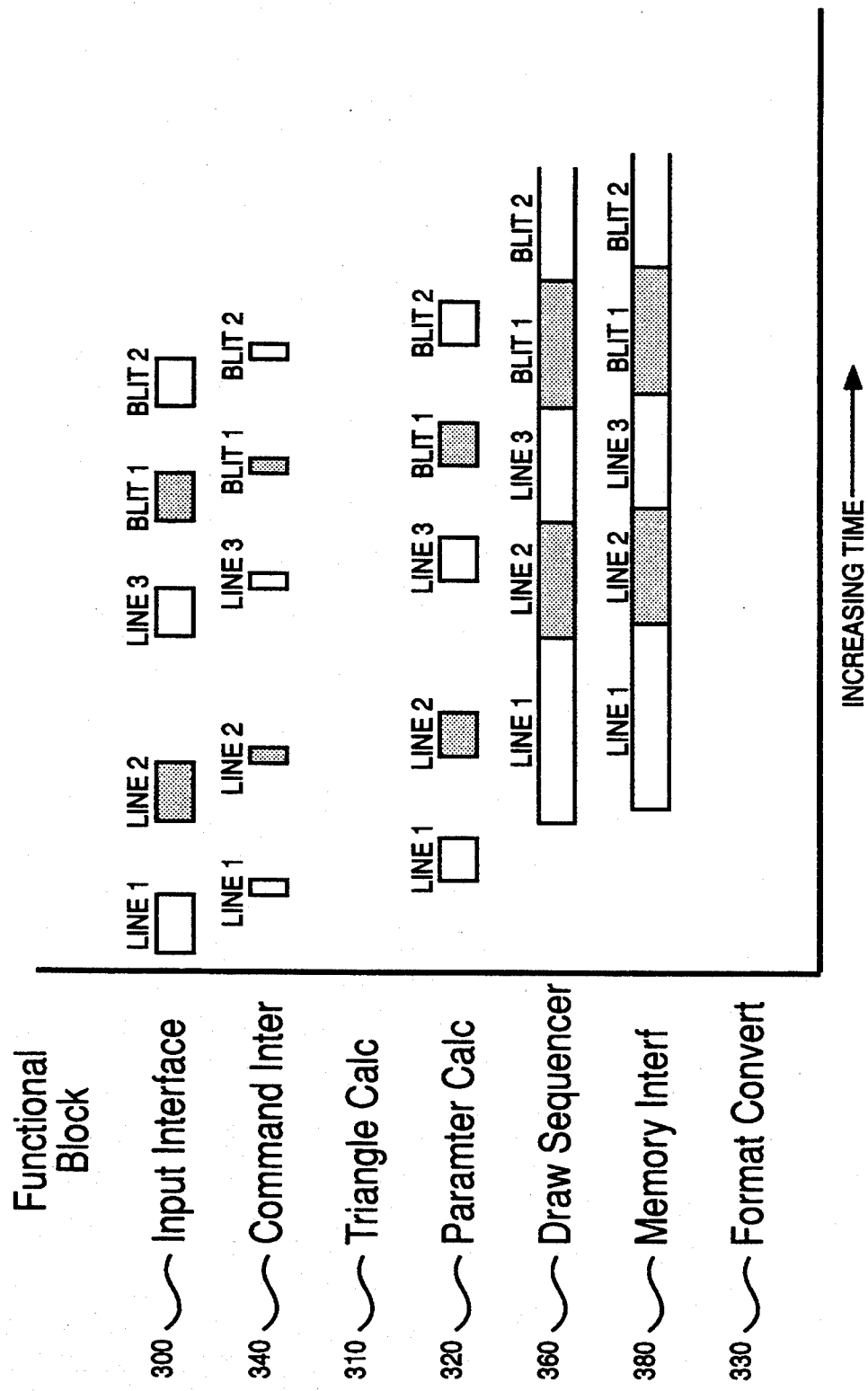
FIGS. 14 through 17 are timing diagrams that show how the rasterization processor and display controller of FIG. 2 would process various types of image primitives.
Figure 15:
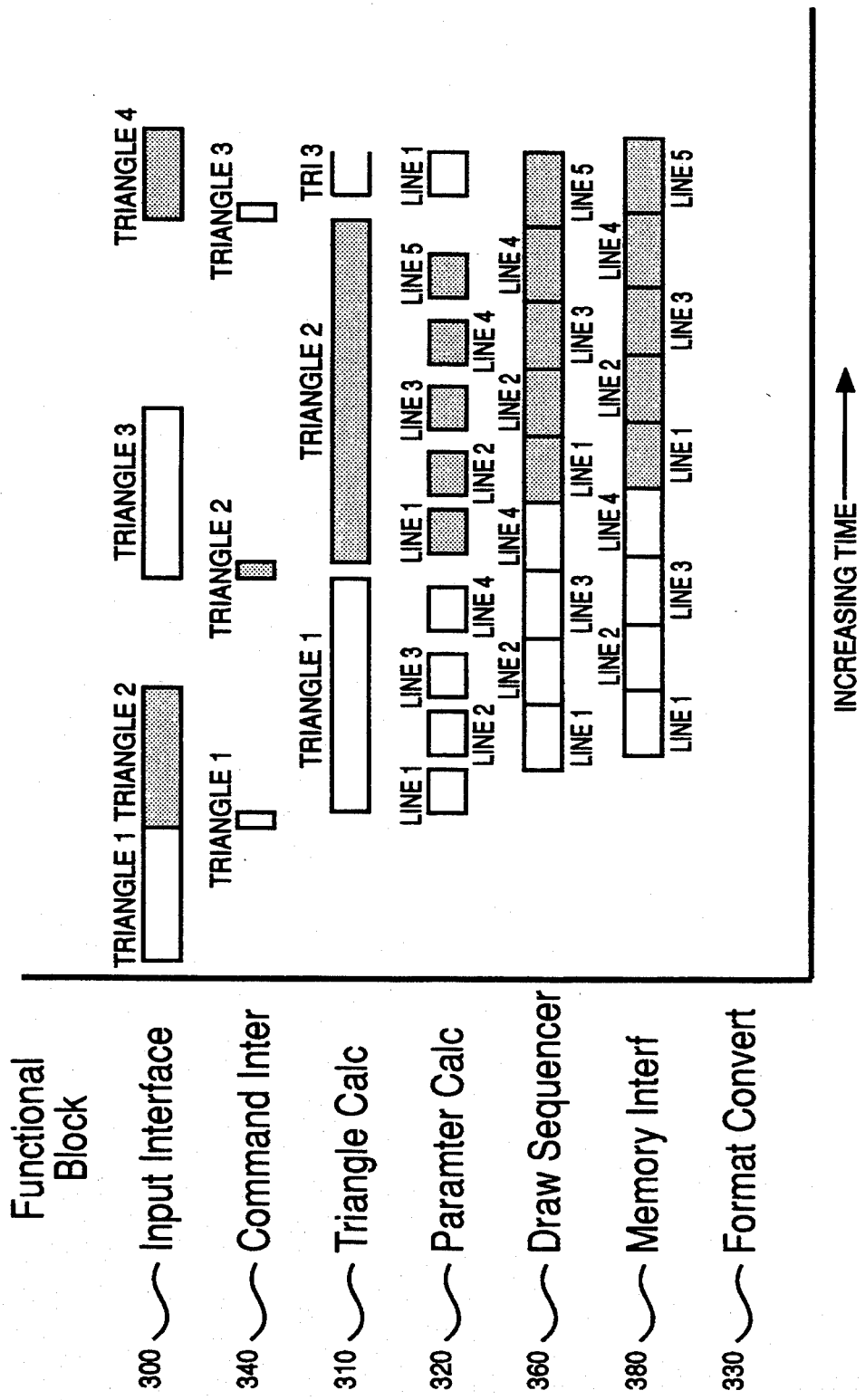
Figure 16:
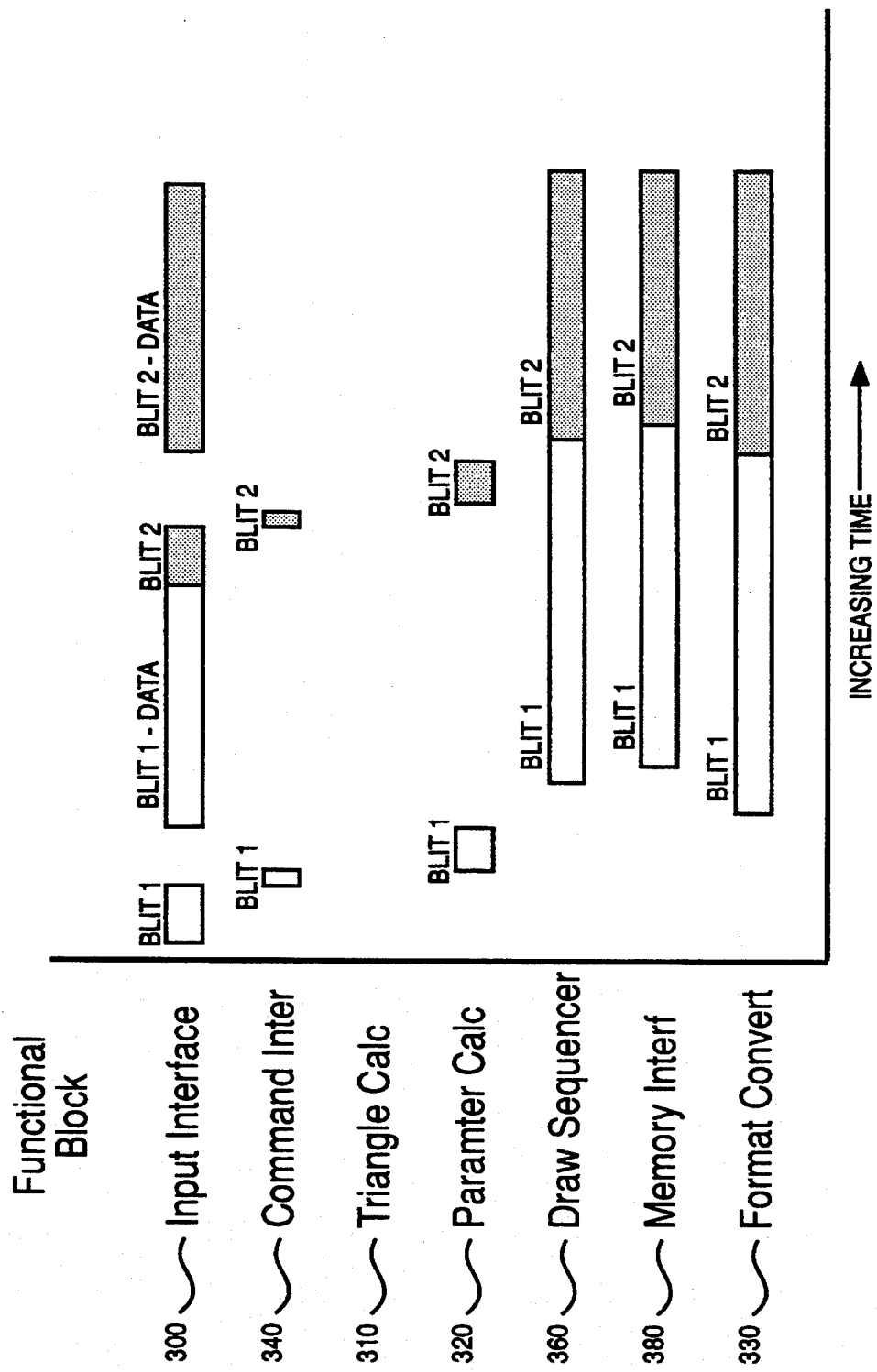
Figure 17:
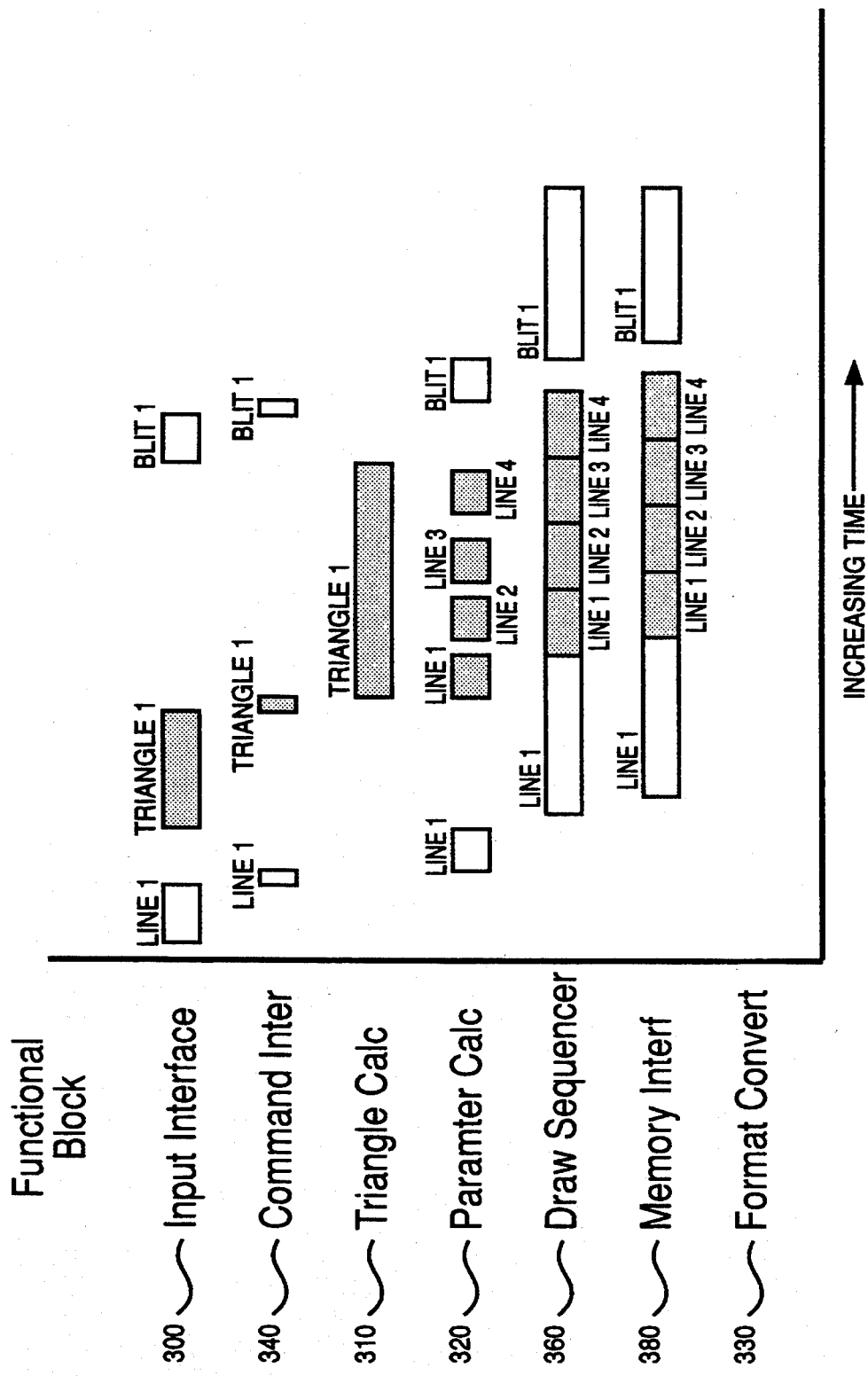

The operation of the pipeline and interlocks are better understood with a few examples. FIG. 8A shows how the rasterizer 220 of FIG. 2 would process a series of lines followed by a series of bitblts. The boxes denote when each subsystem is busy. The shading is to aid in differentiating between adjacent commands. For a line the sequence is as follows. The end points of the line are loaded through the input interface 300, the final value is a go signal to the command interpreter 340, the command interpreter starts the parameter calculator 320 if it is not either busy or waiting for its last set of calculated parameters to be used, the parameter calculator creates necessary values for the draw sequencer 360, and the draw sequencer makes memory requests to the memory hypervisor 380. As soon as one subsystem completes the first line, it is free to work on the next line. Thus, the parameter calculator works on line 2 while the drawing sequencer is working on line 1. Once the first line is started, the memory hypervisor is kept busy. If line 3 is followed by a bitblt, the command interpreter starts the parameter calculator on the bitblt even before the drawing sequencer is finished with a line. Therefore, two different styles of commands are processed in an overlapped fashion and the memory hypervisor maintains maximum utilization.

FIG. 8B shows how the apparatus of FIG. 2 would process a series of triangles. The shading is to aid in differentiating between operations related to adjacent triangles. The sequence is as follows. The parameters of the triangle are loaded through the input interface, the final value is the go signal to the command interpreter, the command interpreter starts triangle interpolator 220 if it is not busy, the triangle interpolator feeds a series of lines (or spans) to the parameter calculator, if it is free, the parameter calculator creates the necessary values for the draw sequencer and the draw sequencer makes memory requests to the memory hypervisor. There are two triangle parameter buffers, so as soon as one triangle is loaded, a second can also be loaded. The third triangle cannot be loaded until the first is completely interpolated. Once the first span of a triangle is started, the memory hypervisor is kept busy. The triangle interpolator has internal storage for two sets of parameters so that there is not an unused stretch of time after one triangle is done while the input interface is busy receiving new parameters for the next triangle.

FIG. 8C shows how the apparatus of FIG. 2 would process a series of external bitblts which require format conversion of the input data (such as a character expansion). The shading is to aid in differentiating between operations related to adjacent bitblts. The sequence is as follows. The parameters of the bitblt are loaded through the input interface, the final value is the go signal to the command interpreter, the command interpreter starts the parameter calculator if it is free, the parameter calculator creates the necessary values for the draw sequencer and the format converter 330, the bitblt data can now begin to come via the input interface which passes it to the format converter, and the draw sequencer makes memory requests to the memory hypervisor once the data path 370 has the data from the format converter. The format converter has an internal FIFO so that it can get ahead of the draw sequencer, thereby allowing the input interface to finish early. Then the parameters for bitblt 2 can be loaded restarting the whole sequence. If the format converter FIFO is large enough and the input interface loads faster than the memory hypervisor can write the pixels, then the memory can be kept utilized. Certainly for characters this is true since for each bit of input data a pixel of output data is generated which is typically 3 bytes (24-bit pixels).

Overlapping operations are supported by having interlocks among the various state machines which allow subsequent operations to begin before the current operation is complete whenever possible. The input interface allows new values to be loaded in registers that are either currently not used or no longer required to be stable. The command interpreter determines which subsystems are involved in the previous command and allows a new command to proceed if the first active block for the new command is not busy processing the previous command. For example, as shown in FIG. 8D, if the new command is a triangle and the previous command was a line (a bitblt would similar), then the command interpreter would pass the triangle interpolator the start triangle signal. The triangle interpolator would then proceed to create the first horizontal span of the triangle, but parameter calculation for that span would be held off until the bitblt and line draw parameter calculator was free. If the line is long enough (or the bitblt large enough), then the input interface loads the triangle before the memory hypervisor completes the previous operation. The first line of the triangle can also be calculated while the previous line is being drawn, keeping the memory utilized. However, when a bitblt follows a triangle, the input interface prevents the bitblt parameters from being loaded until after the last line of the triangle is completed. This would leave a gap in the memory utilization depending on the length of the last line. In FIG. 8D, a small gap is shown, but most lines are long enough so that no gap would exist.

Although the present invention has been fully described above with reference to specific embodiments, other alternative embodiments will be apparent to those of ordinary skill in the art. For example, the Bresenham algorithm for line draws can be broken into more than two sequential tasks that can be performed by more than two subsystems. Therefore, the above description should not be taken as limiting the scope of the present invention which is defined by the appended claims.

What is claimed is:

1. An apparatus to render lines on a display comprising a plurality of processors coupled in series, each processor performing in sequence a portion of a Bresenham line draw algorithm wherein a first at least one processor computes line endpoint location data of a line not parallel to scan lines of the display, a second at least one processor computes line endpoint pixel address data, line orientation data, and initial pixel error data of the line endpoint pixel address data, and a third at least one processor computes pixel location data and pixel error data for each pixel along the line.

2. An apparatus to render lines on a display comprising:
   a) a host computer;
   b) a graphics processor coupled to the host computer, the graphics processor including a plurality of processors coupled in series, each processor performing in sequence a sequential portion of a Bresenham line draw algorithm wherein a first at least one processor computes line endpoint location data of a line not parallel to scan lines of the display, a second at least one processor computes line endpoint pixel address data, line orientation data, and initial pixel error data of the line endpoint pixel address data, and a third at least one processor computes pixel location data and pixel error data for each pixel along the line.

3. A method for rendering lines on a display comprising the steps of:
   a) computing line endpoint location data of a line not parallel to scan lines of the display in a first processor;
   b) computing line endpoint pixel address data, line orientation data, and initial pixel error data of the line using the line endpoint location data and the line end endpoint pixel address data in a second processor;
   c) upon receiving the line location data, line orientation data, and initial pixel error data, computing pixel location data and pixel error data for each pixel along the line from said line location data, line orientation data, and initial pixel error data in a third processor.

4. A graphics processor for rendering lines on a display comprising:
   a) means for providing line primitives including line endpoint location data of a line not parallel to scan lines of the display;
   b) first processing means for receiving line primitives from said providing means and computing line endpoint pixel address data, line orientation data, and initial pixel error data of the line endpoint pixel address data; and
   c) second processing means, coupled in sequence to the first processing means, for computing pixel location data and pixel error data from said line location data, line orientation data, and initial pixel error data for each pixel along the line therefrom.

5. The graphics processor of claim 4 wherein the second processing means includes means for controlling color interpolation.

6. The graphics processor of claim 4 wherein the first processing means includes means for computing line endpoint pixel address data, line orientation data, and initial pixel error data while the second processing means computes pixel location data and pixel error data from previously computed line endpoint pixel address data, line orientation data, and initial pixel error data.

7. The graphics processor of claim 6 further comprising means coupled to the second processing means for displaying pixels addressed by said pixel location data.

8. A method of processing graphics data for rendering lines on a display comprising the steps of:
   a) providing line primitives representing a graphical image including line endpoint location data of a line not parallel to scan lines of the display;
   b) receiving said line primitives and computing line endpoint pixel address data, line orientation data, and initial pixel error data of the line endpoint pixel address data in a first processor; and
   c) upon receiving the line location data, computing pixel location data and pixel error data from said line location data, line orientation data, and initial pixel error data for each pixel along the line therefrom in a second processor coupled in sequence to the first processor.

9. The method of processing graphics data of claim 8 wherein the step of receiving said line primitives and computing line endpoint pixel address data, line orientation data, and initial pixel error data in a first processor occurs while computing pixel location data and pixel error data from previously computed line endpoint pixel address data, line orientation data, and initial pixel error data in a second processor.

10. The method of processing graphics data of claim 9 further comprising the step of displaying pixels addressed by said pixel location 11. The method of processing graphics data of claim 8 including the step of controlling color interpolation while computing pixel location data.

* * * * *